(12) United States Patent
Luo

(10) Patent No.: US 8,045,487 B2
(45) Date of Patent: Oct. 25, 2011

(54) METHOD FOR IMPLEMENTING MULTICAST IN RAPID SPANNING TREE PROTOCOL RING NETWORK

(75) Inventor: Yong Luo, Guangdong Province (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 725 days.

(21) Appl. No.: 11/579,885

(22) PCT Filed: Mar. 31, 2006

(86) PCT No.: PCT/CN2006/000571
§ 371 (c)(1),
(2), (4) Date: Nov. 10, 2006

(87) PCT Pub. No.: WO2006/105723
PCT Pub. Date: Oct. 12, 2006

(65) Prior Publication Data
US 2007/0230370 A1 Oct. 4, 2007

(30) Foreign Application Priority Data
Apr. 4, 2005 (CN) .......................... 2005 1 0063131

(51) Int. Cl.
*H04L 12/28* (2006.01)
(52) U.S. Cl. ........................................ 370/256; 370/312
(58) Field of Classification Search ........................ None
See application file for complete search history.

(56) References Cited

U.S. PATENT DOCUMENTS

| | | | |
|---|---|---|---|
| 5,608,726 A * | 3/1997 | Virgile | 370/401 |
| 5,999,530 A * | 12/1999 | LeMaire et al. | 370/390 |
| 6,032,194 A | 2/2000 | Gai et al. | |
| 6,233,258 B1 | 5/2001 | Kanehara et al. | |
| 6,535,490 B1 * | 3/2003 | Jain | 370/256 |
| 6,556,541 B1 | 4/2003 | Bare | |
| 6,661,788 B2 | 12/2003 | Angle et al. | |
| 6,711,163 B1 * | 3/2004 | Reid et al. | 370/390 |
| 7,061,875 B1 * | 6/2006 | Portolani et al. | 370/256 |
| 7,177,946 B1 * | 2/2007 | Kaluve et al. | 709/242 |
| 7,586,856 B1 * | 9/2009 | Thottakkara et al. | 370/256 |
| 2004/0062209 A1 * | 4/2004 | Goldman et al. | 370/256 |
| 2004/0081171 A1 * | 4/2004 | Finn | 370/395.53 |
| 2004/0240398 A1 | 12/2004 | Ho et al. | |

(Continued)

FOREIGN PATENT DOCUMENTS
WO    WO 98/51041    11/1998

*Primary Examiner* — Ayaz Sheikh
*Assistant Examiner* — Peter Chau
(74) *Attorney, Agent, or Firm* — Slater & Matsil, L.L.P.

(57) ABSTRACT

The present invention discloses a method for implementing multicast in RSTP (Rapid Spanning Tree Protocol) ring network. In the method, the port mode of a program is configured to a fixed port mode, a root port binding mode or an upper layer querier port following mode; a multicast module on access equipment traverses a program table on receiving a root port switching message, updates the corresponding port of each program whose mode is configured to the root port binding mode as the changed root port; or on receiving an IGMP (Internet Group Management Protocol) QUERY packet from a port which is different from a recorded global querier port, the multicast module updates the global querier port as the port receiving the IGMP QUERY packet, traverses the program table, and updates the corresponding port of each program whose mode is configured to the upper layer querier port following mode as the port receiving the IGMP QUERY packet.

13 Claims, 4 Drawing Sheets

U.S. PATENT DOCUMENTS

| | | | |
|---|---|---|---|
| 2005/0198232 A1* | 9/2005 | Haalen et al. | 709/221 |
| 2005/0237943 A1* | 10/2005 | Sasagawa | 370/242 |
| 2005/0243824 A1* | 11/2005 | Abbazia et al. | 370/390 |
| 2006/0079999 A1* | 4/2006 | Husein | 700/275 |
| 2006/0146823 A1* | 7/2006 | Ding | 370/390 |
| 2006/0198323 A1* | 9/2006 | Finn | 370/256 |

* cited by examiner

METHOD FOR IMPLEMENTING MULTICAST IN RAPID SPANNING TREE PROTOCOL RING NETWORK

FIELD OF INVENTION

The present invention relates to the multicast technology in communication technical field, and particularly to a method for implementing multicast in RSTP(Rapid Spanning Tree Protocol) ring network.

BACKGROUND OF INVENTION

The link redundancy method used in the RSTP ring improves the reliability and robustness of a network. The RSTP ring is a networking mode commonly used in Layer 2 aggregation layer in a metropolitan area network. With the increasing requirements of reliability for an access network, this networking mode is becoming the tendency for networking of access network.

As shown in FIG. 1, a link ring is formed by access layer equipments and aggregation layer equipments. It can be ensured that the communication link between each access equipment and aggregation equipment will not be interrupted even when a fault occurs at any point in the ring, thus significantly improving the capability of the access network in defending a single point fault.

The RSTP protocol is used as a topological control protocol in the RSTP ring. However, the application of the RSTP ring hampers the development of broadband video services based on the multicast technology, because the IGMP(Internet Group Management Protocol) is generally used as a control protocol of multicast video service between an access equipment and an aggregation equipment. In this case, in order to maintain the group membership of a program, it is necessary for the access equipment to transmit an IGMP REPORT packet to the aggregation equipment. There are at least two links in the RSTP ring between the access equipment and the aggregation equipment, and only one of the two links is available. As a result, the availability identification of the links becomes the first issue to be dealt with by the access equipment. If the IGMP REPORT packet is transmitted on the wrong link, the upper layer aggregation equipment will not receive the IGMP REPORT packet in a long period, and will consider that the access equipment no longer needs the program, so it will not transmit the multicast packets of the program to the access equipment.

Secondly, in order to prevent an unauthenticated multicast packet from being forwarded via the multicast table, it is necessary for the access equipment to check the source port and source IP address of an incoming multicast packet, to ensure that only the multicast packet transmitted from specific ports and specific video servers can be forwarded to the user port, and prevent an illegal multicast packet from disturbing the normal receiving and viewing of a user. While in the case of an RSTP ring, the port at which a server provides a specific program will vary dynamically, and if the port which is used by the access equipment to check the source port of a multicast program does not vary correspondingly, a normal video packet will not pass the checking and will be discarded.

For example, in the schematic networking diagram as shown in FIG. 2, an RSTP ring is constituted by one aggregation equipment (hereinafter referred to as AG) and two pieces of access equipment (e.g. access equipment A and access equipment B, hereinafter referred to as AXA and AXB, respectively). After the RSTP protocol is enabled, a port "AXB.0/5" with lower priority on the access equipment B (AXB) is blocked depending on the calculation of the spanning-tree. At this time, the aggregation equipment (i.e. AG) is a root bridge, the access equipment A (i.e. AXA) communicates with the aggregation equipment (AG) via a port AXA.0/7 which is the root port (the port for communicating with the root bridge) of the access equipment A (AXA). An IGMP REPORT packet will be transmitted out via the port AXA.0/7 which is also the ingress port of all the video programs. The access equipment B (i.e. AXB) communicates indirectly with the aggregation equipment (AG) via port AXB.0/1(through the access equipment A), its root port is port AXB.0/1. An IGMP REPORT packet will be transmitted out via the port AXB.0/1 which is also the ingress port of all the video programs. When the direct link AG.0/1-AXA.0/7 between the aggregation equipment and the access equipment A is interrupted for some reason, the RSTP protocol will re-converge and re-enable the port AXB.0/5 on access equipment B. At this time, the access equipment A communicates with the aggregation equipment via a port AXA.0/4 which becomes the root port of the access equipment A. If the access equipment A still transmits an IGMP REPORT packet via the port AXA.0/7, the video stream sent from the aggregation equipment will not be received. If the port AXA.0/7 is still considered as the ingress port of a program when checking the source port (actually, the video program stream is transmitted from the port AXA.0/4), the normal video stream can not pass the checking. Similarly, the same problem may also occur on the access equipment B.

At present, in order to solve the above problem, an IGMP REPORT packet is transmitted to all the uplink ports when the IGMP REPORT packet is transmitted upwards, so as to avoid the availability identification of the uplink links. In addition, the source port will not be checked for a video packet. However, it can be seen from this method that, 1. the uplink port of an access equipment may also connect with other network equipments besides one aggregation equipment, and there may be a number of multicast groups on these equipments (generally, a number of content providers may provide video services, among which the same multicast address may be used). If an IGMP REPORT packet is transmitted to all the uplink ports without distinguishing the ports, other equipments will receive the IGMP REPORT packet and then transmit other programs to the access equipment (it shall be noted that these programs are different from the program requested by the access equipment, but they have the same multicast address), so the access equipment will receive unexpected multicast packets.

2. If an IGMP REPORT packet is transmitted to all the uplink ports without distinguishing the ports, it is necessary for the CPUs to process the IGMP REPORT packet, thereby increasing the burden of other uplink equipments.

3. If the source port of a program is not checked, unexpected multicast packets will be transmitted to the user, so the user is unable to watch the program normally.

SUMMARY OF INVENTION

An embodiment of the present invention provides a method for implementing multicast in RSTP (Rapid Spanning Tree Protocol) ring network, in which access equipment can request and check a multicast program properly even when the port changes.

The method for implementing multicast in an RSTP (Rapid Spanning Tree Protocol) ring network including access equipment, includes:

configuring, at the access equipment, corresponding port mode of each program to a fixed port mode, a root port binding mode or an upper layer querier port following mode;

when the access equipment is aware that the root port is switched, updating each corresponding port of each program whose mode is configured to the binding root port mode to the changed root port; and/or when the access equipment is aware that an upper layer querier port is changed, updating each corresponding port of each program whose mode is configured to the upper layer querier port following mode to the changed port.

With the method according to the embodiments of the present invention, the problem that the transmitting port of an IGMP control packet in RSTP ring network is changing is solved, because the corresponding port of a program can be updated according to the variation of the root port when the link in the ring network is switched, so that the IGMP control packet is transmitted from the new root port, thus avoiding the loss of the IGMP packet. In addition, there are a variety of configuration modes for the uplink port of a program, which allows each program to be set separately. This can be applied to not only the normal networking but also the RSTP ring network. Each program supports a separate uplink port configuration mode and a separate uplink port. A number of programs can be distributed on different ports, and the video networking of each port can be independent.

In addition, in the preferred solutions of the present invention, the problem of checking the ingress port by use of a multicast table in the RSTP ring network is solved, because the ingress port of the multicast group in the hardware forwarding table can be refreshed when the link in the ring network is switched, so as to ensure the proper forwarding of a video packet and the checking for the source of a program.

Furthermore, one program is determined uniquely by the ingress port, multicast IP and source IP, so that the confliction of multicast IP addresses may be solved, and the networking adaptability may be improved. Also, the checking for the source of a program is stricter, thereby preventing an illegal multicast packet from being spread viciously, hence the security may be improved.

DETAILED DESCRIPTION OF THE EMBODIMENTS

Figure 1:
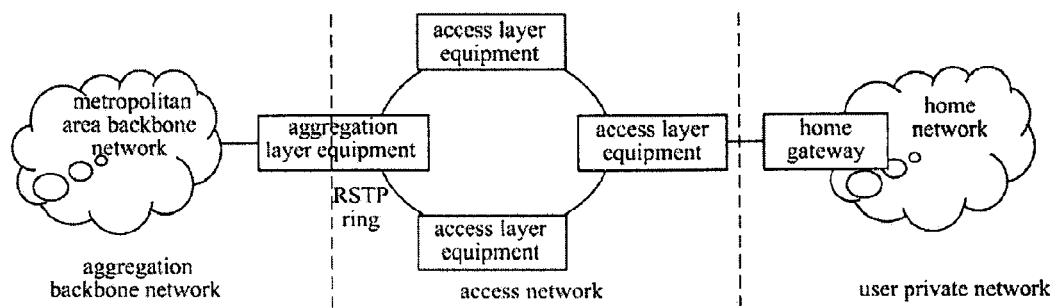
FIG. 1 is a schematic diagram of an access network model networked by use of an RSTP ring.
Figure 2:
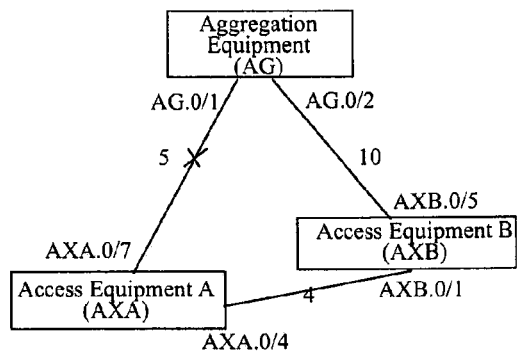
FIG. 2 is a schematic diagram illustrating the variation of equipment ports in a network formed by use of an RSTP ring.

As defined in the RSTP (Rapid Spanning Tree Protocol) protocol, a root port is the port closest to a root bridge. As defined in the IGMP (Internet Group Management Protocol) protocol, a querier port is a port at which a program is issued. In an RSTP ring network, if a program stream is forwarded from a root bridge to each equipment in the network, the root port is the same as the querier port; while if a program stream is forwarded from access equipment in the ring network, the root port and the querier port may be different.

In an RSTP ring network, whether RSTP is enabled or not, it is necessary to learn a global querier port. That is, an upper querier will transmit an IGMP QUERY packet to an access equipment periodically. On receiving the IGMP QUERY packet, the access equipment answers the upper querier with the required program group, the upper layer querier determines the forwarding members of the program group according to the answer of the access equipment.

Each program multicast in the access equipment has two attributes, one is the uplink port configuration mode, and the other is the current port corresponding to the program (i.e. the uplink port). In an embodiment of the present invention, the mode of the corresponding port of a program can be configured to the fixed port mode, the RSTP root port binding mode or upper layer querier port following mode.

If the mode of the corresponding port of a certain program is configured to the fixed port mode, a fixed port is used when an ingress port of the multicast forwarding table item of the program is configured and an uplink IGMP packet is transmitted. This mode is used in the case that the querier port and source port of a program are fixed.

If the mode of the corresponding port of a certain program is configured to the RSTP root port binding mode, the current RSTP root port is used when an ingress port of the multicast forwarding table item of the program is configured and an uplink IGMP packet is transmitted. When the root port changes, an RSTP module transmits a message to notify a video multicast module, wherein the RSTP module is an RSTP protocol stack module running in the access equipment or an aggregation equipment, and the video multicast module is a module running in the access equipment. The video multicast module checks the corresponding programs of the root port, and switch the corresponding port of these programs to a new root port, refresh the ingress port of these programs in the hardware multicast forwarding table simultaneously. The transmitting port of the uplink IGNIP packets of these programs are also switched to the new root port correspondingly. This mode is generally applied in the case that the program sources of a part of the programs come from an RSTP ring.

An upper layer querier port is the port that receives an IGMP QUERY packet periodically. Access equipment can determine the port at which the upper layer querier is located by the receiving of the IGMP QUERY packet. This port may also change in use. When a certain program is configured to querier port following, the learnt upper layer querier port is used when an ingress port of multicast forwarding table of the program is configured and an IGMP packet is transmitted. This mode is generally applied in the case of a single querier, and may be applied in the case that the querier is consistent with the source of the program, and in the case that the querier port may have a change.

When the port configuration mode of a program is modified, the program port configuration mode and the port corresponding to the program in the access equipment are modified correspondingly.

Figure 3:
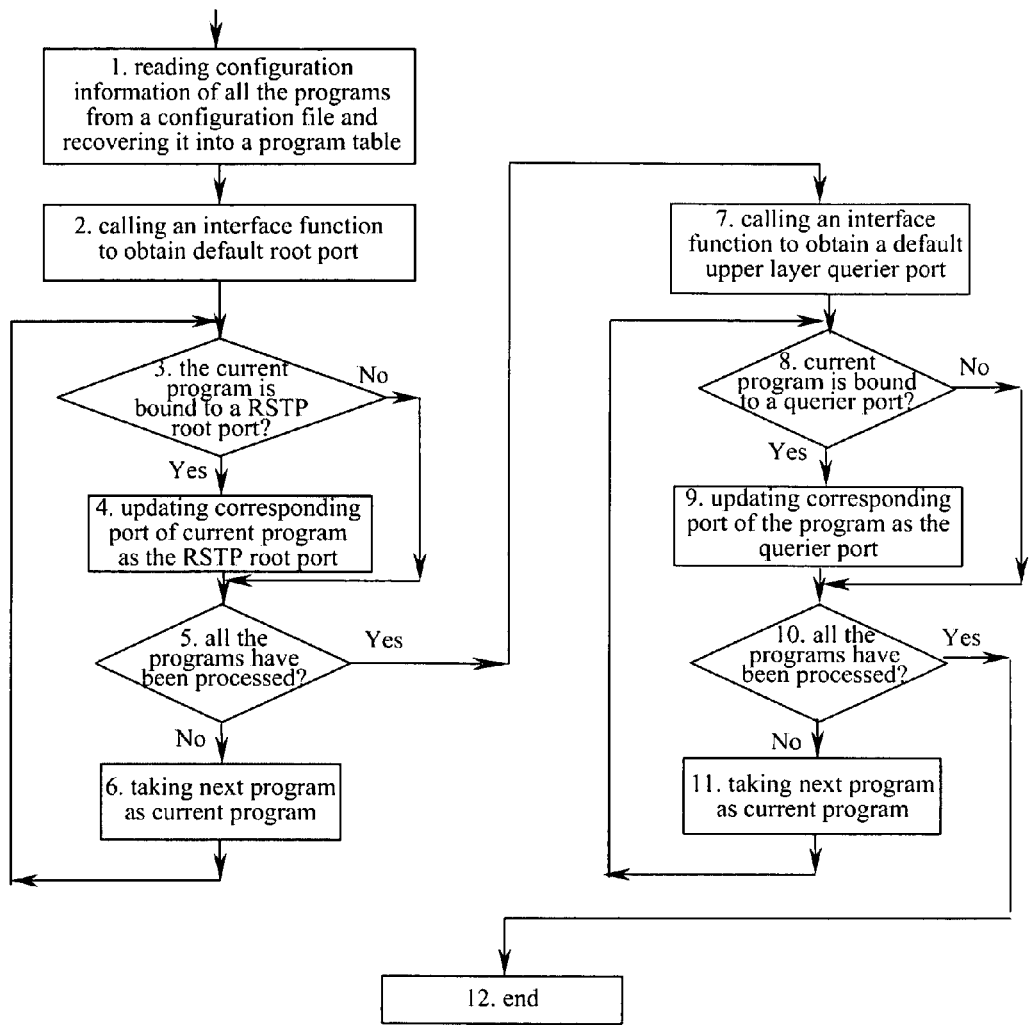
FIG. 3 is a flow chart illustrating the initialization in the configuration of corresponding port of a program.

With reference to FIG. 3, when the system is powered on and initialized, the configuration of the uplink port of a program is as follows:

Step 1: the configuration information of all the programs is read from a local configuration file and recovered into a program table;

Step 2: an interface function is called to obtain a default root port;

Step 3: it is determined whether the current program is bound to an RSTP root port, and if yes, the step 4 will be executed, otherwise, the step 5 will be executed;

Step 4: the corresponding port of the current program is updated to the RSTP root port;

Step 5: it is determined whether all the programs have been processed, and if yes, the step 7 will be executed, otherwise, the step 6 will be executed;

Step 6: the next program is taken as the current program, then returns to the step 3;

Step 7: the interface function is called to obtain a default upper layer querier port;

Step 8: it is determined whether the current program is bound to a querier port, and if yes, the step 9 will be executed, otherwise, the step 10 will be executed;

Step 9: the corresponding port of the program is updated to the upper layer querier port;

Step 10: it is determined whether all the programs have been processed, and if yes, the procedure is terminated, otherwise, the step 11 will be executed;

Step 11: the next program is taken as the current program, then returns to the step 8.

Figure 4:
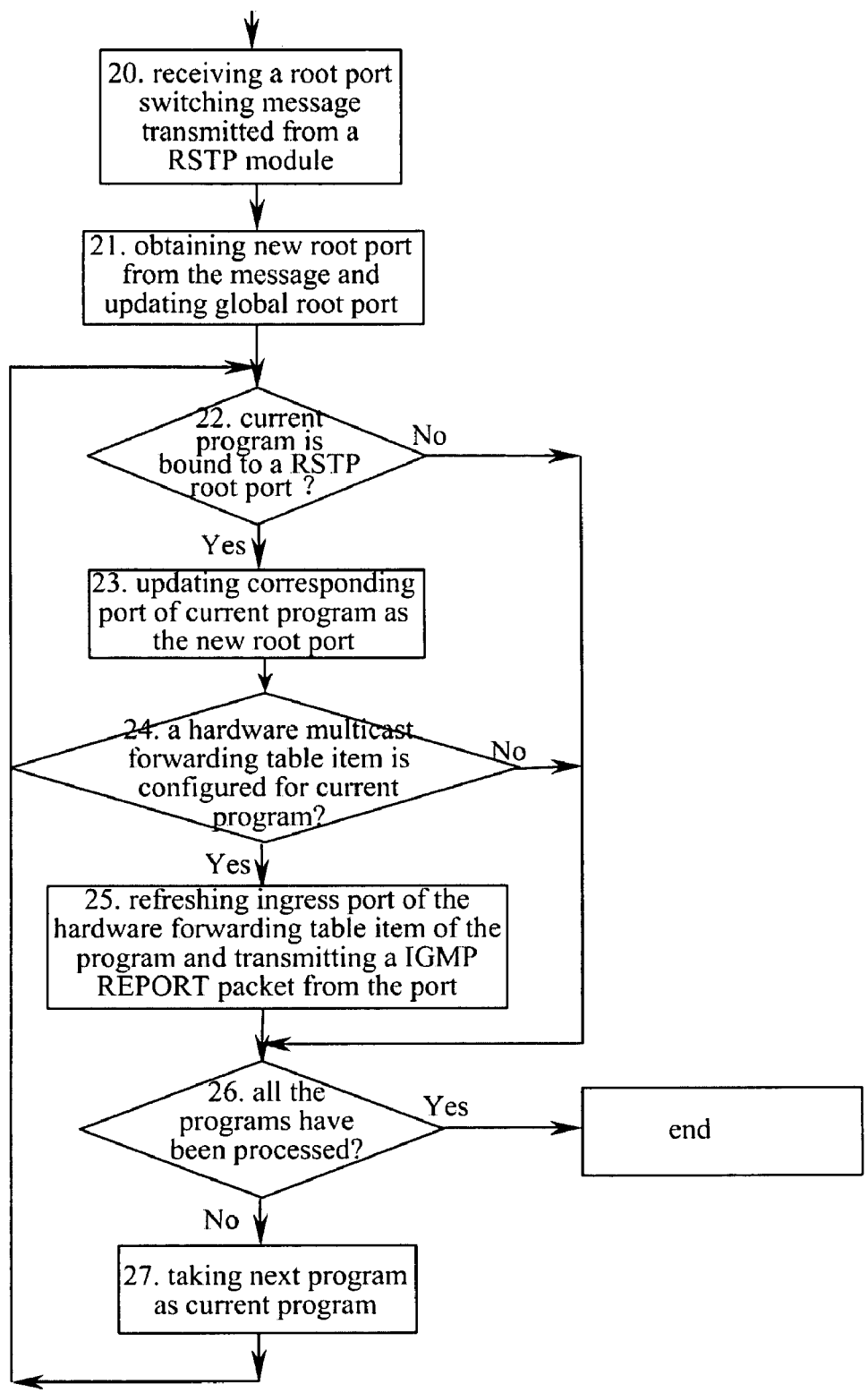
FIG. 4 is a flow chart illustrating the processing of a multicast module when the root port of equipment changes.

With reference to FIG. 4, the process when the root port changes is as follows:

Step 20: a multicast module receives a root port switching message transmitted from an RSTP module;

It is necessary to recalculate the spanning tree when a fault occurs in an intermediate link in an RSTP ring, the root port of the access equipment will change, so the RSTP module will transmit a message notifying the multicast module to switch the root port.

Step 21: a new root port is specified in the root port switching message, from which the multicast module extracts the new root port parameters, and updates the root port parameters in global variables with the new root port parameters;

Step 22: the multicast module traverses the program table to determine whether the mode of the current program is the root port binding mode, if yes, the step 23 will be executed, otherwise, the step 26 will be executed;

Step 23: the corresponding port of the current program is updated to a new RSTP root port, that is, the new RSTP root port is filled in the corresponding port attribute of the program;

Step 24: it is checked whether a hardware multicast forwarding table item is configured for the current program, and if yes, the step 25 will be executed, otherwise, the step 26 will be executed;

Step 25: the ingress port in the hardware forwarding table item is modified as the new root port, so that an multicast video packet may pass the checking when entering the ingress port;

After the corresponding port of the program is updated, an IGMP REPORT packet is sent from the new root port to the upper layer querier, to ensure the local access equipment is included in the group members of this program in the upper layer querier;

Step 26: it is determined whether all the programs have been processed, if yes, the processing will be terminated, otherwise, the step 27 will be executed;

Step 27: the next program is taken from the program table as the current program, then returns to step 22.

Figure 5:
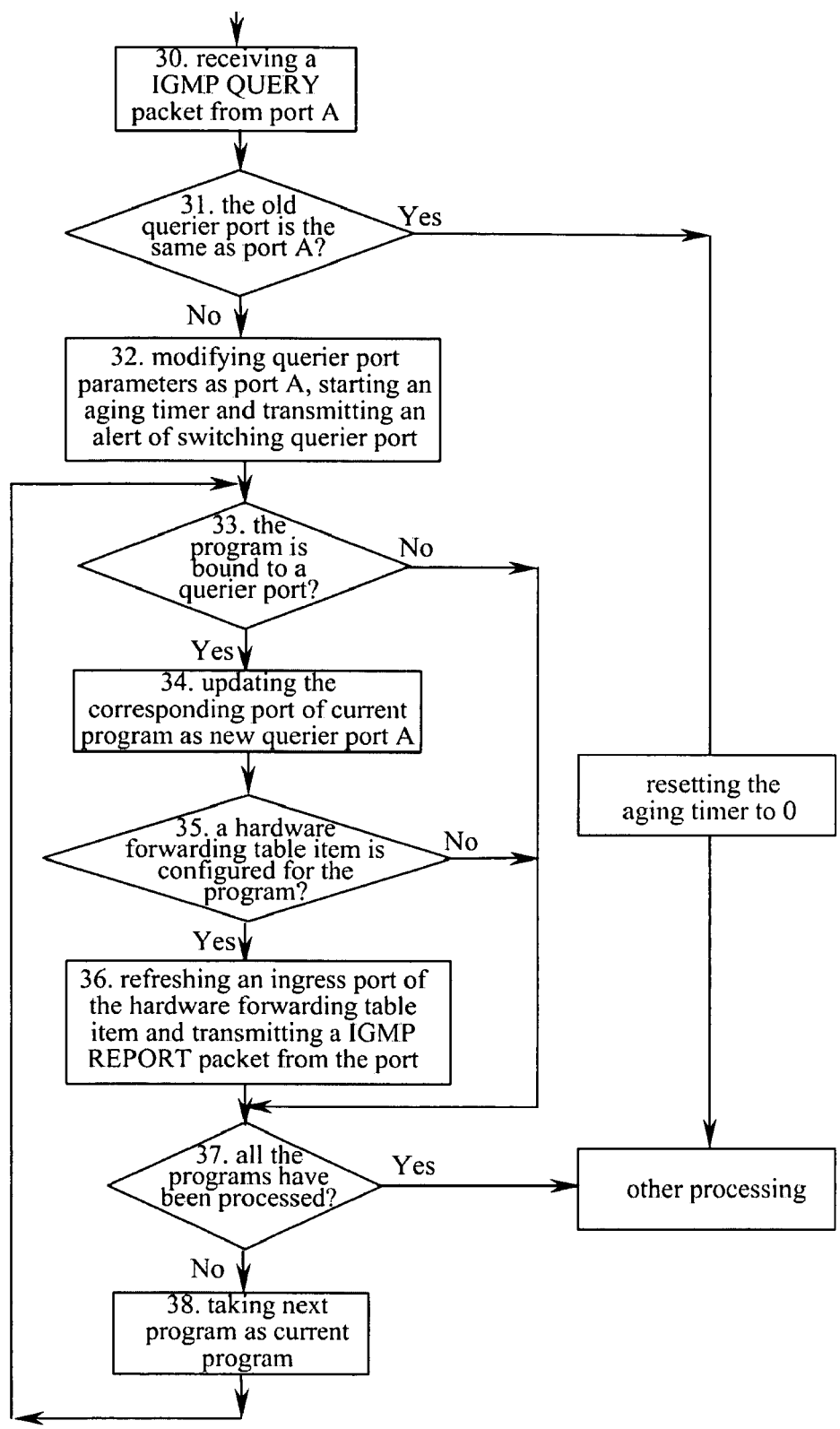
FIG. 5 is a flow chart illustrating the learning process of a querier port.

With reference to FIG. 5, the learning procedure of the upper layer querier port is as follows:

Step 30: an IGMP QUERY packet is received from an uplink port A;

Step 31: it is checked whether the global querier port stored in the global variables is the same as the uplink port A, and if not, the step 32 will be executed, otherwise, the time of the aging timer of the global querier port is reset to 0, the aging counting is restarted and it is continued with the other processing;

Step 32: the querier port parameters in the global variables are modified as the parameters of the uplink port A, the aging timer is started and an alert of switching the querier port is transmitted. The overtime of the aging timer is set to an aging value of the querier. This aging value is configured by the user;

Step 33: it is determined whether the current program is bound to a querier port, and if yes, the step 34 will be executed, otherwise, the step 37 will be executed;

Step 34: the corresponding port of the program in the program table is updated to the uplink port A;

Step 35: it is determined whether a hardware multicast forwarding table item is configured for the current program, and if yes, the step 36 will be executed, otherwise, the step 37 will be executed;

Step 36: the ingress port in the hardware forwarding table item is modified as the port A, so that a multicast video packet entering the ingress port may pass the checking. After the corresponding port of the program is updated, an IGMP REPORT packet is transmitted from the port A to the upper layer querier, to ensure the local access equipment is included in the group members of the program in the upper layer querier;

Step 37: it is determined whether all the programs in the program table have been processed, and if yes, other processing will be continued, otherwise, the step 38 will be executed;

Step 38: the next program is taken from program table as the current program, then returns to the step 33.

In order to record the faults of the upper layer querier, the access equipment sets an aging timer for the learnt querier port, if a new IGMP QUERY packet is not received from this port for a long time, it means that an fault occurs in the upper layer querier or in the link, then this fault is recorded by use of an alert or log, for tracking at a later time.

In an embodiment of the present invention, one program is determined uniquely by the combination of ingress port, source IP address and multicast address in the program table on an access equipment, so that different programs can use the same multicast IP address as long as their source IP addresses are different. Thus, different content providers can use the same multicast address, so that the multicast IP addresses can be saved. Similarly, the three parameters of ingress port, source IP address and multicast address can be used to validate the legality of a multicast packet.

For example, as defined by a system manager, the multicast IP address of a network program A is 239.1.1.1, the source port is 0/7/0, the source server IP address is 211.38.10.2, these source information is set into the hardware (LSW chip or FPGA chip), and it is required to perform a source checking for the program. If a third party uses a fake server (211.38.9.10) to issue a false program A from a port 0/1/13 to the Internet, the packets of the false program will be discarded on the access equipment because of the inconsistency of the source port and source IP, thus normal issuing of the program will not be disturbed.

Apparently, those skilled in the art should recognize that various variations and modifications can be made without departing from the spirit and scope of the present invention. Therefore, the present invention also intends to cover these variations and modifications provided that these variations and modifications are within the scope of the following claims of the present invention and their equivalent.

What is claimed is:

1. A method for implementing multicast in a Rapid Spanning Tree Protocol (RSTP) ring network comprising access equipment, the method comprising:

configuring, at the access equipment, an uplink port and a port mode of the uplink port for each of multicast programs, wherein a variety of port modes including a fixed port mode, a root port binding mode and an upper layer querier port following mode are allowed to be configured to each of multicast programs separately;

when the access equipment is aware that a RSTP root port is switched, transmitting by a RSTP protocol module at the access equipment a root port switching message including a changed RSTP root port to a multicast module at the access equipment, after determining by the multicast module that a first multicast program is binded to the RSTP root port in response to the root port switching message, updating by the multicast module a first uplink port of a first multicast program whose mode is configured to the root port binding mode to the changed RSTP root port, updating by the multicast module an ingress port of the first multicast program in a hardware multicast forwarding table and a transmitting port of a first uplink Internet Group Management Protocol (IGMP) packet of the first multicast program to the changed RSTP root port and transmitting a first IGMP REPORT packet from the changed RSTP root port to an upper layer querier device so as to ensure the access equipment is included in group members of the first multicast program; and when the access equipment is aware that an upper layer querier port is changed, updating a second uplink port of a second multicast program whose mode is configured as the upper layer querier port following mode to a changed upper layer querier port.

2. The method according to claim 1, wherein the access equipment is aware that the RSTP root port is switched when a root port switching message in RSTP protocol is received.

3. The method according to claim 1, wherein the access equipment is aware that the upper layer querier port is changed when: the access equipment receives an IGMP QUERY packet from one port and determines that the port is different from a recorded global querier port; and wherein the method further comprises: updating the recorded global querier port to the port receiving the IGMP QUERY packet.

4. The method according to claim 3, wherein after updating the global querier port to the port receiving the IGMP QUERY packet, the method further comprises:

transmitting a second IGMP REPORT packet from the updated global querier port to an upper layer querier device, to ensure the access equipment is included in group members of the second multicast program.

5. The method according to claim 4, wherein if a hardware multicast forwarding table item has been configured for the second multicast program, the method further comprises: updating an ingress port of the second multicast program in the hardware multicast forwarding table and a transmitting port of a second uplink IGMP packet to the port receiving the IGMP QUERY packet.

6. The method according to claim 5, wherein a multicast program is determined by ingress port, multicast Internet Protocol (IP) address and source IP address in a program table.

7. The method according to claim 6, wherein the access equipment validates a source of a program by use of the ingress port, multicast IP address and source IP address.

8. The method according to claim 4, wherein after updating the global querier port to the port receiving the IGMP QUERY packet, the method further comprises:

alerting and logging if a new QUERY packet has not been received from the port in a predetermined period.

9. The method according to claim 1, wherein a multicast program is determined by the access equipment based on an ingress port, a multicast Internet Protocol (IP) address and a IP source address in a program table, wherein different multicast programs with different source IP addresses can use the same multicast IP address.

10. The method according to claim 9, wherein the access equipment validates a source of a multicast program by use of the ingress port, multicast IP address and source IP address.

11. The method according to claim 1, wherein:

when a port of a multicast program is configured, at the access equipment, to the fixed port mode, the port of the multicast program is fixed;

when a port of a multicast program is configured, at the access equipment, to the root port binding mode, the port of the multicast program follows a change in the RSTP root port;

when a port of a multicast program is configured, at the access equipment, to the upper layer querier port following mode, the port of the multicast program follows a change in the upper layer querier port.

12. An access equipment for implementing multicast service in a Rapid Spanning Tree Protocol (RSTP) ring network, wherein:

the access equipment is configured to configure an uplink port and a port mode of the uplink port for each of multicast programs, wherein a variety of port modes including a fixed port mode, a root port binding mode and an upper layer querier port following mode are allowed to be configured to each of multicast programs separately;

when the access equipment is aware that a RSTP root port is switched, a RSTP protocol module at the access equipment is configured to transmit a root port switching message including a changed RSTP root port to a multicast module at the access equipment, and the multicast module is configured to update a first uplink port of a first multicast program whose mode is configured to the root port binding mode to a changed RSTP root port, update an ingress port of the first multicast program in a hardware multicast forwarding table and a transmitting port of a first uplink Internet Group Management Protocol (IGMP) packet of the first multicast program to the changed RSTP root port and transmit a first IGMP REPORT packet from the changed RSTP root port to an upper layer querier device so as to ensure the access equipment is included in group members of the first multicast program; and when the access equipment is aware that an upper layer querier port is changed, the multicast module is configured to update each uplink port of each multicast program whose mode is configured as the upper layer querier port following mode to a changed upper layer port.

13. The access equipment according to claim 12, wherein a multicast program is determined by an ingress port, a multicast Internet Protocol (IP) address and a source IP address in a program table, wherein different multicast programs can use the same multicast IP address as long as their source IP addresses are different.

* * * * *